United States Patent
Nunes et al.

(10) Patent No.: US 6,685,783 B1
(45) Date of Patent: Feb. 3, 2004

(54) METHOD FOR MAKING A PART IN SHAPE MEMORY ALLOY AND PART OBTAINED BY SAID METHOD

(75) Inventors: Daniel Nunes, Saclay (FR); Patrick Olier, Chatillon (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/889,939

(22) PCT Filed: Jan. 26, 2000

(86) PCT No.: PCT/FR00/00173

§ 371 (c)(1),
(2), (4) Date: Jul. 25, 2001

(87) PCT Pub. No.: WO00/44957

PCT Pub. Date: Aug. 3, 2000

(30) Foreign Application Priority Data

Jan. 27, 1999 (FR) .............................................. 99 00871

(51) Int. Cl.[7] .......................... C22F 1/00; B21C 23/00; C22K 1/00
(52) U.S. Cl. ........................................ 148/563; 148/402
(58) Field of Search ................................ 148/563, 402, 148/676

(56) References Cited

U.S. PATENT DOCUMENTS 4,490,975 A * 1/1985 Yaeger et al. .................. 60/527
4,772,112 A * 9/1988 Zider et al. .................... 351/41
4,896,955 A * 1/1990 Zider et al. .................... 351/41
5,556,370 A * 9/1996 Maynard ..................... 600/151

FOREIGN PATENT DOCUMENTS

JP 59-192401 * 1/1984
JP 0 408 259 A1 1/1991

OTHER PUBLICATIONS

Patent Abstracts of Japan, vol. 014, No. 49 (M–0927), Jan. 29, 1990 & JP 01 277684 A (Sharp Corp), Nov. 8, 1989, abstract.

Patent Abstracts of Japan, Pub. No. 59192401, Pub. Date Oct. 31, 1984, Sumitomo Electric Ind Ltd.

* cited by examiner

Primary Examiner—George Wyszomierski
(74) Attorney, Agent, or Firm—Pearne & Gordon LLP

(57) ABSTRACT

This invention relates to a process for manufacturing, shaping, and machining of a part made of a shape memory alloy, comprising a single step in which the said part is fabricated, shaped and machined simultaneously in a single operation by a cutting machining process such as turning. The invention is also related to the part prepared by this process, which is particularly a helical spring with adjacent turns. In particular, this part may be used in actuator or actuator/sensor type devices.

15 Claims, 2 Drawing Sheets

METHOD FOR MAKING A PART IN SHAPE MEMORY ALLOY AND PART OBTAINED BY SAID METHOD

DESCRIPTION

The invention relates to a process for manufacturing, shaping and machining a shape memory alloy part, and the part obtained that has remarkable functional properties.

The technical field of the invention may be defined in general as being metallurgy and science of materials. More particularly, the invention is in the field of shape memory alloys, and their fabrication and shaping or machining.

Remember that a metallic alloy has a shape memory if, after permanent deformation when cold or during cooling under stress, it returns to its initial shape simply by heating. This phenomenon, called a single directional memory effect (EMSS) is caused by a martensitic transformation that occurs above a critical temperature called the "transition temperature". This transition temperature may be adjusted between −200° C. and +170° C., by acting on the chemical composition and/or heat treatments.

Furthermore, martensitic transformation confers other particular properties on shape memory alloys (AMF) for example the capacity to generate a large force during heating; the super elastic effect, the rubbery effect, the assisted two-directional memory effect (EMDSA) and the two-directional memory effect (EMDS). The presence of the martensitic phase also significantly increases the damping capacities.

The performances of an AMF element can usually be estimated in terms of displacement amplitude and recovery force available when heating.

All specific properties of shape memory alloys explain the "functional materials" or "intelligent materials" terminology often used to qualify them.

The shape memory effect has been known in metallic alloys since 1930 and the first industrial application was in 1967, but due to the complexity of their behavior, their extreme sensitivity to fabrication conditions and their cost, their industrial and commercial development has remained very limited and mainly applies to sectors using state-of-the-art technologies such as the defense, space and medical equipment industries.

Fabrication procedures used to fabricate shape memory alloys depend on the required application and the final geometry required for the AMF part or element.

Shape memory alloy parts used for the main applications found so far have a simple geometry. There are usually bars, for example used in deployment mechanism actuators in space and actuators for robotics; for example, wires in dental fixtures, medical instrumentation, portable telephone antennas, spectacle frames, clothes; flats or strips in spectacle manufacturing, electrical activators in household automation equipment; or springs or "stents" for stenosis in the medical field and "telltales" for detecting a failure in the cooling system in the food processing industry, etc.

The shaping processes used to obtain parts with the geometries mentioned above correspond to the use of conventional transformation means such as extrusion presses for producing bars; drawing and wire drawing benches to produce wires; rolling mills to obtain sheet metal, and shaping dies to make springs.

Machining processes may also be used for the purposes of any shaping operation by the removal of material intended to confer dimensions and a surface condition on an AMF part, for example a difference in shape and roughness within a given tolerance range.

In general, machining of the AMF takes place within the sequence of shaping operations, mainly at two levels:
  either as a blank cutting operation for a blank to be rolled, forged, stamped or machined;
  or as a finishing operation for previously extruded, drawn, forged parts, and parts assembled by welding.

Among the shaping processes mentioned above, processes that make use of cold shaping are difficult to implement on shape memory alloys, particularly on titanium-nickel alloys, and particularly due to the hardness of these materials.

In general, cold deformation must be limited to avoid damage and must include annealing steps at a controlled temperature to restore the material.

However, cold deformation is essential for these materials, because it provides not only precision on the final dimensional characteristics, but it also confers work hardening on the material that improves the mechanical properties and enables optimization of functional properties such as shape memory effect, the recovery force and super elasticity. It has also been demonstrated that as the work hardening effect increases, in other words as the deformation rate increases, the functional properties, and particularly the recovery force and the amplitude of the memory effect improve. Furthermore, after the last cold deformation phase, a short-term "flash" heat treatment must be carried out within a defined temperature range to optimize the functional properties.

The above confirms that the fabrication of finished parts, in other words parts with a defined geometry made of a shape memory alloy, requires long, complex and therefore expensive fabrication and shaping procedures, including cold transformation operations that are difficult to control.

Therefore, there is a need for a simple, fast and economic process for fabrication and shaping of a shape memory alloy part, comprising a limited number of steps and capable of producing parts with mechanical and functional properties at least equivalent to what can be obtained with known, long, complex and expensive processes.

The purpose of this invention is to divulge a process for fabrication and shaping of a shape memory alloy part that satisfies all the needs mentioned above, that does not have the disadvantages, defects, limitations and disadvantages of processes according to prior art and that solves problems that arise with processes according to prior art.

According to the invention, this and other purposes are achieved by a fabrication, shaping and machining process for a shape memory alloy part comprising a single step during which the fabrication, shaping and machining of the said part are done simultaneously in a single operation by a cutting machining process.

The process according to the invention satisfies all the needs mentioned above, does not have any of the defects of processes according to prior art and solves problems that arise with processes according to prior art.

Surprisingly, the inventors found that by applying a specific machining process, namely a cutting machining process, to shape memory alloys it is possible to perform fabrication, machining and shaping operations in a single step. Cutting machining processes are the only known machining processes capable of achieving the purposes mentioned above and solving problems according to prior art.

Cutting machining processes have the special feature that they preferably produce chips, unlike processes that remove material by abrasion, or by chemical or electrochemical methods.

Surprisingly, the cutting machining process used in the invention confers very high work hardening on the part or chip made of shape memory alloy and is simultaneously accompanied by extremely fast temperature rise that performs the same function as the heat treatment, this "flash" heat treatment actually corresponding to the final heat treatment performed in processes according to prior art. Consequently, with the process according to the invention, it is possible to obtain remarkable mechanical and functional properties on the chip in a single operation. The inventors have demonstrated that the properties of parts obtained by the process according to the invention, for example springs, are better than the properties that can be obtained on an AMF part or element obtained by a long and complex fabrication process according to prior art.

The process according to the invention is a means of directly obtaining the required remarkable properties after a single step.

Unlike processes according to prior art that involve a long series of complex shaping and machining steps, in most cases with a final cold deformation step followed by another heat treatment, the process according to the invention includes only one step during which all operations necessary for fabrication and shaping and machining of the part are done simultaneously. Furthermore, this single step is extremely simple, since it makes use of a simple, reliable and tested cutting machining process.

The process is extremely fast compared with processes according to prior art, since apart from the time saving obtained by minimizing the number of steps, the duration of the single step involving cutting machining is also reduced.

Consequently, the simplicity and speed at which the part such as a chip of shape memory alloy is made, will cause a very low unit cost compared with fabrication processes according to prior art. Consequently, broader "general public" applications, in the past impossible for shape memory alloys due to their prohibitive cost, could be considered for parts manufactured by the process according to the invention.

According to the invention, the cutting machining process is usually selected among high speed cutting machining processes, usually greater than 15 m/min and low speed cutting machining processes, usually at less than or equal to 15 m/min.

For example, high-speed cutting machining processes include milling, turning, traverse grinding, screw cutting, drilling, and low speed cutting machining processes include planing, tapping, forming mortises and broaching.

According to the invention, one or several machining parameters, in other words operational parameters of the cutting machining process, are varied in order to, make a part such as a uniform and continuous chip with a defined geometry and/or with required mechanical and/or functional properties.

This or these machining parameter(s) are usually chosen, for example, among the nature of the cutting tool, the pass penetration depth (or the cut thickness), the machine advance speed or the cutting speed, the angular position of the cutting tool, the sharpening of the cutting tool, and possibly the rotation speed of the blank from which the part is made.

Note that these parameters are usually not independent and are related to the geometry of the blank part used.

For example, the rotation speed depends on the geometry of the blank, and particularly the diameter of the blank, and depends on the capacities of the machine used. This speed may vary within wide limits. For example, a typical speed is 250 rpm.

The shape memory alloy used in the process according to the invention may be any known shape memory alloy. For example, it may be chosen among copper based alloys, titanium and nickel based alloys, and iron based alloys.

Copper based alloys include Cu—Zn, Cu—Al, Cu—Sn, Cu—Zn,—Al, Cu—Al—Ni, Cu—Al—Mn, Cu—Al—Be alloys. Ti—Ni based alloys include alloys of titanium and nickel in all proportions, and preferably 50—50 Ti—Ni alloys. The Ti—Ni alloy may slightly be alloyed with one or more Fe, Cu, Zr and Hf additive elements.

Fe based alloys include the $Fe_3Pt$ compound, and Fe—Ni—Co—Ti and Fe—Mn—Si alloys with additions of Ni and/or Cr if necessary. The term "shape memory" alloy covers all alloys that do or could have this type of property, and "shape memory" properties usually include single directional memory effect (EMSS) properties, two-directional memory effect (EMDS) properties, assisted two-directional memory effect (EMDSA) or super elasticity properties.

The invention also relates to a shape memory alloy part that can be manufactured by the process according to the invention.

More precisely, the said part is usually a chip, preferably uniform and continuous. Preferably, the geometry of this chip is defined, and the chip may be in the shape of a strip or ribbon, preferably with a precisely defined length, width and thickness, but it may also be in the shape of a wire, flat or others.

Furthermore according to the invention, the chip, preferably in the shape of a ribbon, may be wound directly at the end of the process without any additional step, in other words a spring is obtained without any additional operation, for example a helical spring preferably with adjacent turns can be obtained directly in a single operation, useable in all types of devices requiring shape memory alloy springs. This type of helical spring has excellent mechanical and functional properties, better than the properties of springs obtained by processes according to prior art.

The chip is also defined by its mass and volume and the spring, preferably with adjacent turns, is also defined by the diameter of the turns, the total number of turns and the number of turns used.

For example, the mass of the chip will usually be from 1 mg to 50 mg, the width of the chip in the shape of a ribbon will usually be from 1 or a few hundredths of mm (for example 2 to 9 hundredths) to 5 mm, and the thickness of the chip will usually be from 1 or a hundredths of an mm (for example 2 to 9 hundredths), to 1 or several tenths of an mm (from example 2 to 9 tenths).

In the preferred case, the chip is wound and therefore is therefore in the shape of a spring, preferably a helical spring and preferably with adjacent turns, the total number of useful turns is usually from 2 turns to 1 or a few hundredths of turns (for example 200 to 1000) and the total number of turns is usually from 2 to 1 or a few hundredths of turns (for example 200 to 1000), the diameter of the turns is usually from 1 to 15 mm.

As mentioned above, the part, in other words the chip, obtained by the process according to the invention, has remarkable mechanical and functional properties. One of the most representative functional properties is the efficiency that defines the work available per unit volume of the AMF.

The maximum efficiency of the part obtained by this process according to the invention, such as a helical spring with adjacent turns, is usually greater than 10 MJ/m3, and preferably from 10 to 15 MJ/m3, which is significantly better than the efficiency of parts such as helical springs prepared by processes according to prior art and clearly differentiates parts according to the invention from parts prepared according to prior art.

The invention also relates to any device or system comprising the AMF part or chip according to the invention. In particular, the invention also deals with an actuator or actuator/sensor type system or device comprising the AMF part according to the invention.

The shape memory alloy part or device according to the invention has single directional memory effect (EMSS), two-directional memory effect (ESDS), assisted two-directional memory effect (EMDSA) or super elasticity properties. The part prepared by the process according to the invention is thus used in many industrial sectors. In priority, it is aimed at domains in which the use of AMFs have not been widespread in the past, or were even unusable due to economic reasons alone, but the invention is also used in all industrial domains in which AMFs are already used conventionally.

For example, it could be used for many general public applications such as toys, decoration, sculpture.

Potential applications also apply to the miniaturization sector in which an AMF chip can be competitive with a mini-spring.

For example, this needs to be taken into consideration in micro robotics and in the automobile industry for which thermal activators are used in many applications such as radiator plug, fan disconnection, air conditioning regulator, brake cooling, etc.

The invention will be better understood after reading the following description of a preferred embodiment given for illustration purposes, this description being made with reference to the attached drawings in which.

Figure 1A:
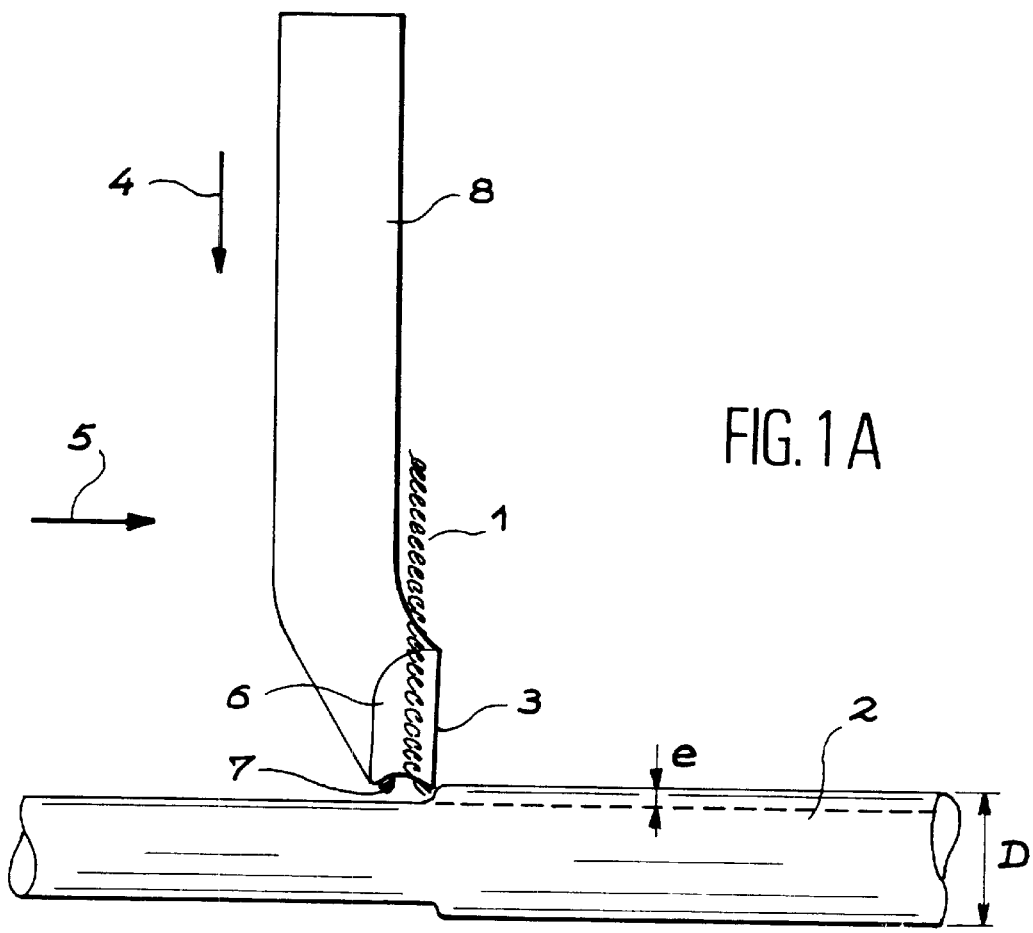
FIG. 1A is a top diagrammatic or sectional view showing machining by turning of a shape memory alloy (AMF) blank, to produce a continuous chip.

Therefore, FIG. 1 illustrates the special case of fabrication of a chip with adjacent turns made of a shape memory alloy (1) obtained by turning from a metallic blank made of a shape memory alloy (2) that is preferably in the shape of a cylindrical bar with a diameter (D), preferably between 5 and 100 mm, for example 12 mm.

The shape memory alloy may be chosen among any one of the alloys mentioned above, and preferably it will be a Ti—Ni alloy.

The chip (1) is manufactured using a conventional turning (traverse grinding) machine such as a lathe fitted with a cutting tool (3) placed on a support (8).

For example, lathes such as those made by the CAZENEUVE Company could be used, and particularly model 360 HB—X.

Arrows (4) and (5) on FIG. 1A show the advance direction and the cutting direction respectively of the cutting tool.

The cutting tool (3) used has a brazed insert.

For example, it may be a tungsten carbide tool, for example a K 10 type tool (ISO standard) made by the SAFETY® Company.

It is preferable that the cutting tool shown on FIG. 1 is sharpened in a special manner, for example done by a grinding wheel.

For example, this special sharpening may be groove-shaped (6), for example with a specific shape, for example a transverse section in the shape of an arc of a circle with a specific radius r (7) for example from 1 to 10 mm as a function of the diameter of the blank, preferably 2 mm.

This type of groove obtained by specific sharpening in this manner with a grinding wheel, facilitates removal and winding of the chip (1) during the cut so that a uniform and continuous chip is produced.

Figure 1B:
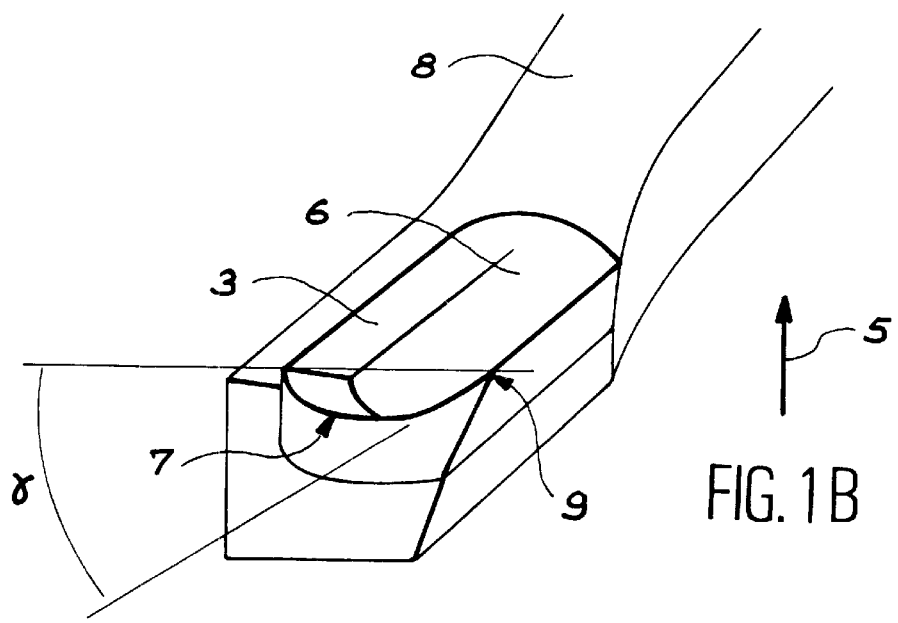
FIG. 1B is a perspective diagrammatic view of the cutting tool.

FIG. 1B is a perspective view of the cutting tool that gives a better illustration of the different machining parameters, and the different geometric parameters of the cutting tool.

The cutting tool (3) that is preferably in the shape of a brazed insert, is based on an insert support or carrier (8).

This cutting tool comprises a groove (6) that pushes the chip clear, the bottom of the said groove of the said cutting tool having a special radius r (7). The cutting tool (3) also comprises a tool tip (9). The cutting angle γ is also shown in FIG. 1B.

It has been seen above that the choice of the machining parameters, in other words in this case the parameters of the turning process, can also be used to obtain a chip with a defined geometry and with the required functional properties such as the memory effect and super elasticity properties directly.

Thus, in order to obtain a chip in ribbon form behaving like a spring with adjacent turns, the operational turning parameters must preferably be within the following ranges:

penetration depth per pass (or cut depth) represented by e on FIG. 1, from 0.1 to 5 mm, for example 0.88 mm;

machine advance speed (cutting speed): from 5 to 40 m/min., for example 10 m/min.;

cutting angle defined by an angle γ (see FIG. 1B) from 5 to 40°, for example from 10 to 15°;

blank rotation speed, depending on the capacities of the machine used, for example 250 rpm.

The conditions mentioned above are the conditions that can be used to obtain a chip in the shape of a uniform continuous ribbon forming a spring with adjacent turns for which the thickness, length and width are within the ranges given above. Obviously, if it is required to obtain a part with a different shape, the machining parameters will probably be within different ranges.

The invention will now be described with reference to the following examples, given as illustrative and non-restrictive purposes.

EXAMPLE 1

This example applies to the fabrication, characterization and measurement of the properties of a chip with adjacent turns obtained by turning starting from a metallic blank made of a titanium-nickel alloy (50—50) in the shape of a 12 mm diameter cylindrical base.

Machining Conditions

Machining by turning (traverse grinding) was done on a CAZENEUVE lathe model 360 HB—X. Table 1 summarizes the chip manufacturing conditions.

TABLE 1

Tuning machining parameters of an AMF chip

| NATURE OF THE CUTTING TOOL USED | CUTTING SPEED | ROTATION SPEED | CUTTING ANGLE | PENETRATION DEPTH PER PASS |
|---|---|---|---|---|
| Carbide tool type K 10 | 10 m/min. | 250 rpm | 10 < γ < 15° cutting angle with radius (r - 2 mm) | 0.88 mm |

Special sharpening of the cutting tool using a grinding wheel made of vitrified agglomerate produces a groove with a radius that facilitates removal and winding of the chip at the time of cut. The positive cut edges give a good shape to the chip and control its removal from the groove, as can be seen on FIG. 1B.

Table 2 contains typical geometric characteristics of a chip obtained.

TABLE 2

Geometric characteristics of an AMF chip

| Chip mass | M | = | 0.730 g |
|---|---|---|---|
| Chip volume* | V | = | 0.114 cm3 |
| Chip length | L | = | 80 mm |
| Chip width | w | = | 0.88 ± 0.02 mm |
| Chip thickness | t | = | 0.26 ± 0.02 mm |
| Turn diameter | D | = | 2.15 ± 0.02 mm |
| Total number of turns | Nt | = | 76 |
| Number of useful turns | Nu | = | 72 |

*The volume of the chip is deduced from the mass, assuming that the density of Ti - Ni (50 - 50) is equal to 6.4 g/cm3.

The volume of the chip is deduced from the mass, assuming that the density of Ti—Ni (50 —50) is equal 6.4 g/cm3.

Shape Change Temperature

The thermal characteristics of the chip, namely the phase change temperature and enthalpy, are obtained by analysis by differential scanning calorimetry (DSC) on a 53 mg mass of the chip prepared in table 2. Table 3 shows the characteristics.

TABLE 3

Transition temperatures between the Austenite <=> Martensite phase and the enthalpy

| | PHASE TRANSFORMATION TEMPERATURES (° C.) AND ENTHALPY (J/g)* | | | | | | |
|---|---|---|---|---|---|---|---|
| | M 10% | M 50% | M 90% | A 10% | A 50% | A 90% | ΔH HEAT |
| Removal of the AMF chip (53 mg) | −21 | 17 | 48 | 42 | 61 | 73 | 20.1 |

*Phase transformation temperatures are measured according to French standard NF A 51-080, April 1991.

According to these values, it can be said that a chip, initially with adjacent turns drawn at low temperature will resume its initial shape at temperatures between A 10% (10% of martensite when heating)=42° C. and A 90% (90% martensite when heating)=73° C.

Shape Memory Property

One method of evaluating the shape memory effect properties and the recovery force of AMF consists of drawing the chip with adjacent turns in its "low temperature" (martensitic) phase, by suspending a threaded mass from one of its ends.

The chip can be heated until its "high temperature" (austenitic) phase, to observe contraction of the chip related to the memory effect. At this stage, the displacement amplitude during heating can be measured, and the recovery force can be determined (mass suspended at the end of the chip).

The maximum work ($W_H$) supplied by the AMF during heating is the product of the recovery force and the displacement.

The efficiency is defined by the ratio of the maximum work ($W_H$) provided to the volume (V) as described in the document written by G. GUENIN "Les alliages à mémoire de forme (Shape memory alloys)", Engineer techniques, chapter M530, page 10, section 6.21.

The functional properties obtained on the chip are given in table 4.

TABLE 4

Functional properties of an AMF chip

| APPLIED FORCE (N) | COLD DISPLACE-MENT AMPLITUDE (EXTENSION) (mm) | HEATING DISPLACE-MENT AMPLITUDE (CONTRAC-TION) (mm) | ASSO-CIATE D WORK $W_H$ (J = N.m) | EFFI-CIENCY $W_H/V$ (MJ/m3) |
|---|---|---|---|---|
| 0.35 | 10 | 10 | 0.035 | 0.31 |
| 1.10 | 62 | 57 | 0.061 | 0.54 |
| 1.36 | 87 | 79 | 0.11 | 0.93 |
| 2.68 | 168 | 143 | 0.37 | 3.30 |
| 3.73 | 195 | 152 | 0.56 | 4.88 |
| 4.00 | 205 | 157 | 0.62 | 5.40 |
| 4.64 | 250 | 182 | 0.83 | 7.27 |
| 6.15 | 305 | 200 | 1.21 | 10.58 |
| 7.60 | 309 | Breakage of the chip | 0 | 0 |

Figure 2:
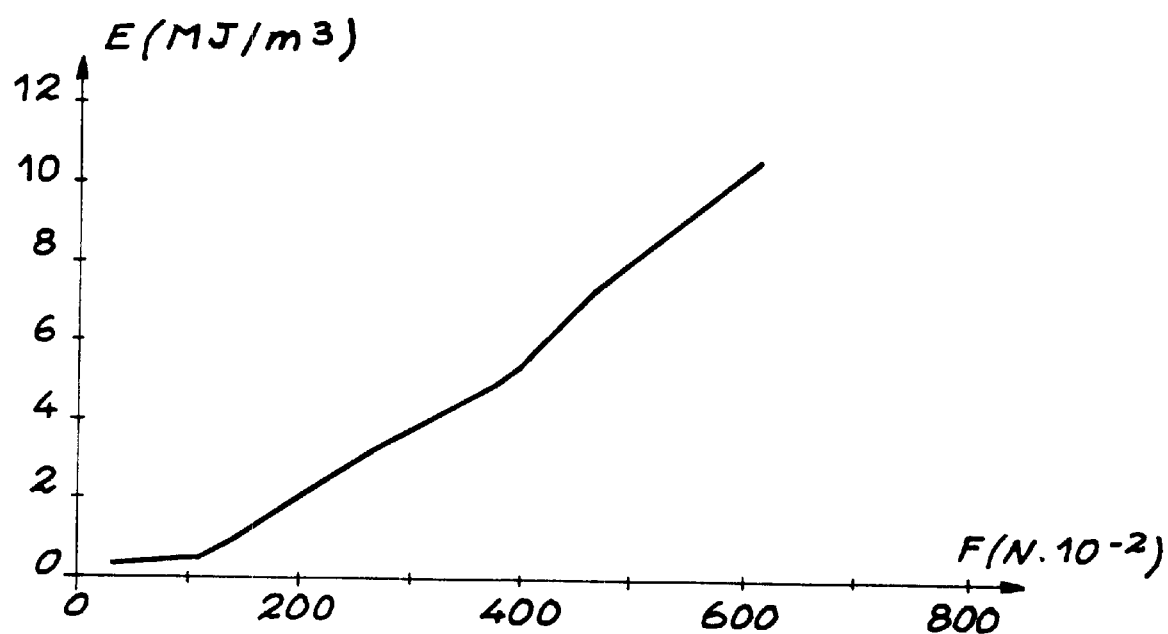
FIG. 2 is a graph showing the variation in the efficiency W/V (E) (in $MJ/m^3$), as a function of the recovery force (F) (in $10^{-2}$ N) generated when the AMF chip is heated.

FIG. 2 is a graph that shows the variation of the efficiency in MJ/m3 as a function of the recovery force (in $N.10^{-2}$) generated when heating the AMF chip.

EXAMPLE 2

A comparison between the results obtained with the material in the process according to the invention, and the results of an AMF material obtained by a manufacturing process according to prior art, for example wire obtained by extrusion and shaped as a spring by stamping.

In this example, the properties of a chip obtained by the process according to the invention (see example 1), and particularly the efficiency, are compared with the properties obtained using AMF materials according to prior art defined in different documents.

Tests carried out on TiNi wire are described in the document by C. M. JACKSON et al., "55—Nitinol—The alloy with a memory", NASA report—SP 5110, 1972, and indicate an efficiency of between 3.4 and 15.1 $MJ/m^3$ for a tension load.

For a helical spring, the efficiency factor defined in the document by G. GUENIN, already mentioned above, must be reduced by a factor of 2 to 3 compared with a tension loading mode. This would show that the maximum efficiency on the spring obtained with an AMF wire is 15/2 $MJ/m^3$, in other words of the order of 7.5 $MJ/m^3$.

The AMT Company that manufactures AMF springs recommends a force of 2.5 N for a displacement of 12 mm with a spring volume V=119.1 $mm^3$, namely an efficiency of 0.25 $MJ/m^3$, P. MEYLAERS & al., CADSMA$_{TM}$: "Computer Aided Design of Shape Memory Applications".

According to the document by B. PRANDI & al., "Experience in the production of Ti—Ni shape memory alloys", $6^{th}$ world conf. On Titanium, 1988, pp. 1063–1068, an AMF spring with a volume V=1080 $mm^3$ can generate a force of 20 N and a displacement of 50 mm, giving an efficiency of 0.9 $MJ/m^3$.

These bibliographic data clearly illustrate the superiority of performances obtained with the AMF chip prepared by the process according to the invention, for which the efficiency is better than 10 MJ/m3.

What is claimed is:

1. Process for manufacturing, shaping and machining a part made from a shape memory alloy, comprising a single step during which the fabrication, shaping and machining of the said part are done simultaneously in a single operation by a cutting machining process, in which one or several operational parameters of the cutting machining process is varied in order to make a uniform and continuous part in the form of a chip from a metallic blank of shape memory alloy, said chip having desired mechanical and/or functional properties.

2. Process according to claim 1, in which the said cutting machining process is a high-speed cutting machining process.

3. Process according to claim 2, in which the said high speed cutting machining process is either a turning, traverse grinding, or screw cutting process.

4. Process according to claim 1, in which the said cutting machining process is a low-speed cutting machining process.

5. Process according to claim 4, in which the said low speed cutting machining process is a planing process.

6. Process according to claim 1, in which at least one said operational parameter is selected from the group consisting of the nature of the cutting tool, the penetration depth per pass, the cutting speed, the cutting angle, and the sharpness of the cutting tool.

7. Process according to claim 6, in which the said cutting machining process is a turning process having operational parameters within the following ranges:

penetration depth per pass: from 0.1 to 5 mm;

cutting speed: from 5 to 40 m/min.;

cutting angle from 5 to 40°.

8. Process according to claim 7, in which the cutting tool is sharpened in the shape of a groove with a cross-section in the shape of an arc of a circle with a specific radius.

9. Process according to claim 7, said penetration depth per pass being 0.88 mm, said cutting speed being 10 m/min., said cutting angle being from 10 to 15°.

10. Process according to claim 7, a further operational parameter being a rotation speed of the metallic blank of 250 rpm.

11. Process according to claim 6, at least one of said operational parameters being rotation speed of the blank from which the part is made.

12. Process according to claim 1, in which the said shape memory alloy is selected from the group consisting of copper based alloys, titanium and nickel based alloys, iron based alloys, and alloys thereof.

13. Part made from a shape memory alloy obtained by the process according to claim 1 in the shape of a uniform and continuous chip, in which the said chip is wound in the shape of a helical spring with adjacent turns, in which the maximum efficiency of the said spring is greater than 10 MJ/m$^3$.

14. Process according to claim 1, including the step of work hardening said chip accompanied by simultaneous heating thereof.

15. Process according to claim 1, said cutting machining process resulting in said uniform and continuous part in the form of said chip from said metallic blank of shape memory alloy having defined geometry that is predictable and reproducible by varying said one or several operational parameters.

* * * * *

UNITED STATES PATENT AND TRADEMARK OFFICE
CERTIFICATE OF CORRECTION

PATENT NO. : 6,685,783 B1
DATED : February 3, 2004
INVENTOR(S) : Daniel Nunes et al.

It is certified that error appears in the above-identified patent and that said Letters Patent is hereby corrected as shown below:

Title page,
Item [56], References Cited, FOREIGN PATENT DOCUMENTS, please delete
"JP    59-192401    *    1/1984", and insert therefor
-- JP    59-192401    *    10/1984 --; and
please delete "JP    0 408 259 A1    1/1991", and insert therefor
-- EP    0 408 259 A1    1/1991 --.

Column 6,
Table 1, line 61, please delete "$10 < \gamma < 15°$", and insert therefor -- $10° < \gamma < 15°$ --.

Column 7,
Please delete the paragraph beginning at line 21 and ending at line 23 in its entirety, as this paragraph is a duplicate of footnote proceeding Table 2.

Signed and Sealed this

Twenty-second Day of June, 2004

JON W. DUDAS
*Acting Director of the United States Patent and Trademark Office*